United States Patent
Adler et al.

(10) Patent No.: US 7,155,672 B1
(45) Date of Patent: Dec. 26, 2006

(54) METHOD AND SYSTEM FOR DYNAMIC FONT SUBSETTING

(75) Inventors: Douglas R. Adler, Naperville, IL (US); Gregory J. Nawrocki, Naperville, IL (US); Peter A. Korp, Naperville, IL (US); Masakatsu Yoneda, Sakura (JP)

(73) Assignee: Spyglass, Inc., San Francisco, CA (US)

( * ) Notice: Subject to any disclaimer, the term of this patent is extended or adjusted under 35 U.S.C. 154(b) by 0 days.

(21) Appl. No.: 09/576,754

(22) Filed: May 23, 2000

(51) Int. Cl.
G06F 17/21 (2006.01)
G06F 17/28 (2006.01)
G06F 17/24 (2006.01)

(52) U.S. Cl. ............... 715/542; 715/511; 715/513; 715/530; 715/531; 715/536; 715/540

(58) Field of Classification Search ............... 715/530, 715/513, 511, 531, 540, 536, 542
See application file for complete search history.

(56) References Cited

U.S. PATENT DOCUMENTS

| | | |
|---|---|---|
| 5,361,332 A | 11/1994 | Yoshida et al. |
| 5,524,181 A | 6/1996 | Sung et al. |
| 5,533,174 A | 7/1996 | Flowers, Jr. et al. |
| 5,533,180 A | 7/1996 | Zhou et al. |
| 5,548,740 A | 8/1996 | Kiyohara |
| 5,586,242 A | 12/1996 | McQueen, III et al. |
| 5,617,122 A | 4/1997 | Numata et al. |
| 5,617,528 A | 4/1997 | Stechmann et al. |
| 5,731,800 A | 3/1998 | Suyaga |
| 5,740,462 A | 4/1998 | Igarashi |

(Continued)

FOREIGN PATENT DOCUMENTS

JP 2000132449 5/2000

OTHER PUBLICATIONS

Microsoft Press Computer Dictionary, 1997, Microsoft Press, Third Edition, p. 288.*

Primary Examiner—Stephen S. Hong
Assistant Examiner—Joshua D Campbell
(74) Attorney, Agent, or Firm—Schwegman, Lundberg, Woessner & Kluth, P.A.

(57) ABSTRACT

Methods and system for dynamic font subsetting. One or more directives are inserted into electronic content to identify one or more glyph sub-sets needed to display the multiple characters in one or more desired languages for electronic content. A directive identifies a glyph sub-set including set of glyphs identified in the electronic content and an encoding scheme used to encode the set of glyphs. The glyph sub-set identifies only those glyphs needed to display the electronic content. When electronic content with the one or more directives is processed the one or more directives are identified. If the electronic device does not have the glyph sub-sets needed to display the electronic content, requests are sent to an intermediate network device to obtain glyph sub-sets. These method and system may allow an electronic device with limited resources, such as a wireless telephone, personal digital assistant, network appliance, set-top box, etc., to display electronic content from a computer network such as the Internet or an intranet, with virtually any font, even if the fonts from the electronic content do not exist on the electronic device. Electronic content written in languages such as Chinese, Japanese, Korean, Vietnamese, etc. can be displayed on an electronic device with limited resources using a small number of glyphs from the multiple thousands of possible glyphs that represent characters in such languages.

34 Claims, 5 Drawing Sheets

U.S. PATENT DOCUMENTS

| | | |
|---|---|---|
| 5,781,714 A * | 7/1998 | Collins et al. .............. 345/471 |
| 5,835,098 A | 11/1998 | Lipton |
| 5,903,289 A | 5/1999 | Takayanagi |
| 5,925,103 A | 7/1999 | Magallanes et al. |
| 5,933,584 A | 8/1999 | Maniwa |
| 5,940,581 A * | 8/1999 | Lipton ....................... 358/1.11 |
| 5,946,105 A | 8/1999 | Oishi et al. |
| 5,990,907 A | 11/1999 | Colletti |
| 6,061,070 A | 5/2000 | Sugaya |
| 6,065,008 A * | 5/2000 | Simon et al. ................. 707/10 |
| 6,111,654 A | 8/2000 | Cartier et al. |
| 6,148,346 A | 11/2000 | Hanson |
| 6,157,905 A * | 12/2000 | Powell .......................... 704/2 |
| 6,320,587 B1 | 11/2001 | Funyu |
| 6,324,500 B1 | 11/2001 | Amro et al. |

* cited by examiner

FIG. 1

METHOD AND SYSTEM FOR DYNAMIC FONT SUBSETTING

COPYRIGHT AUTHORIZATION

A portion of the disclosure of this patent document contains material, which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF INVENTION

This invention relates to computer networks. More specifically, it relates to a method and system for dynamic font subsetting for text in electronic content to better utilize fonts on resource constrained devices.

BACKGROUND OF THE INVENTION

The Internet is a world-wide network of interconnected computers. The World-Wide-Web is an information system on the Internet designed for electronic document interchange. Electronic documents on the World-Wide-Web are typically stored in files that include text, hypertext, references to graphics, animation, audio, video and other electronic data. The structure of hypertext documents is defined by document markup languages such as is defined by document markup languages such as Standard Generalized Markup Language ("SGML"), Hyper Text Markup Language ("HTML"), Compact Hyper Text Markup Language ("cHMTL"), extensible Markup Language ("XML"), Handheld Device Markup Language ("HDML"), Voice extensible Markup Language, ("VoxML"), Wireless Markup Language ("WML"), and others.

As is known in the art, a hypertext document includes markup codes called "element tags." Element tags define the structure of a hypertext document and typically includes at least a "begin" tag name enclosed by a delimiter and, in many instances, an "end" tag name enclosed by a delimiter. For example, the markup tag "<H1>" signifies the beginning of a Hyper Text Markup Language first level header, and the markup tag "</H1>" signifies the end of a Hyper Text Markup Language first level header. However, the Hyper Text Markup Language image tag "<IMG . . . >" ends with the closing tag delimiter ">" and does not use an end tag in the format "<\IMG". Other markup languages have similar tags used to create hypertext documents. Hereinafter, the element tags are called mark-up tags.

Markup languages allow references to additional content besides text including graphics, animation, audio, video and other electronic data. The Hyper Text Markup Language allows use of graphical images in a hypertext document with an image "<IMG>" tag. For example, an exemplary Hyper Text Markup Language image tag <IMG SRC="logo jpg"> allows a graphical logo image stored in a Joint Pictures Expert Group file "logo jpg" to be displayed.

Hypertext documents from the World-Wide-Web are typically displayed for a user with a software application called a "browser" such as Internet Explorer, by Microsoft Corporation of Redmond Wash., or Netscape Navigator, by Netscape Communications of Mountain View, Calif., and others. A browser typically parses a hypertext document and converts hypertext, including markup tags, into a visual display of text, graphics, animation, audio, video, etc., for display on a device such as a personal computer display.

Additional content is retrieved in a hypertext document from other sources using "hyperlink" references within hypertext documents. For example, an exemplary Hyper Text Markup Language hyperlink tag "<A HREF="http://www.spyglass.com/logo.mov">" provides a hyperlink to a movie file "logo.mov." When a user selects the link (e.g., with a mouse click) in a hypertext document, the movie file "logo.mov" is located using a Uniform Resource Locator ("URL") from the location "www.spyglass.com." Hyper Text Transfer Protocol is used as the transfer protocol.

Transfer protocols such as Hyper Text Transfer Protocol ("HTTP"), File Transfer Protocol ("FTP"), Gopher, and others provide a means for transferring hypertext documents or additional content from other locations on the World-Wide-Web. Hyper Text Transfer Protocol is one primary protocol used to transfer information on the World-Wide-Web. Hyper Text Transfer Protocol is a protocol that allows users to connect to a server, make a hypertext request, get a response, and then disconnect from the server. File Transfer Protocol is a protocol that provides access to files on remote systems. Using File Transfer Protocol, a user logs onto a system, searches a directory structure and downloads or uploads a file. Gopher is a protocol similar to File Transfer Protocol. Gopher provides a series of menus linked to files containing actual hypertext.

Content providers on the World-Wide-Web provide custom content using attributes from markup language tags. For example, the Hyper Text Markup Language IMG tag includes the following attributes: ISMAP, a selectable image map; SRC, a source Uniform Resource Locator of an image; ALT, a text string used instead of an image; ALIGN, for alignment of an image (e.g., left, middle, right); VSPACE, the space between an image and the text above and below it; HSPACE, the space between and image and the text to its left or right; WIDTH, the width in pixels of an image; HEIGHT, the height in pixels of an image; and a few other attributes depending on the browser being used (e.g., BORDER and LOWSRC in a Netscape browser).

In addition, other content attributes such as text can be modified using colors (e.g., TEXT="blue," or TEXT="0xa6caf0" for sky blue), font types (e.g., FONT FACE="Times Roman"), character formatting, (e.g., <B>text</B> for bold text), etc.

There are a large number of electronic devices that can be used to display electronic content from computer networks like the Internet, intranets and other computer networks. The electronic devices include personal computers, wireless telephones, personal digital assistants, handheld computers, set-top boxes and Internet appliances and other types of electronic devices. These devices may display electronic content using one or more fonts.

As is known in the art, a "font" is a single instance of a typeface. A "typeface" refers to the style of a character or a glyph. A "character" is a member of a set of shapes used for the organization, control and representation of information. A "glyph" is a specific instance of a character.

The current generation of electronic devices suffer from a number of problems when they are used to display electronic content. One problem is that such devices typically have limited resources (e.g., memory) and may be only able to store one or two types of fonts for one or two languages. However, electronic content provided on a computer network like the Internet, an intranet or other computer network can include virtually any font for virtually any language. As a result, an electronic device may have to obtain additional fonts to display such electronic content.

Another problem is that a language such as Chinese, Japanese Korean, Vietnamese, etc. that use alphabets of characters including pictographs or ideographs or logographs have much larger storage requirements for their fonts. The storage requirements for such languages may vary based on the size of the corresponding character set. Individual glyphs used to create 10,000 unique pictographs, ideographs or logographs can easily include 30,000 or more unique glyphs.

Another problem is that storage of a complete set of glyphs for a pictograph, ideograph or logograph based language may be prohibitive on electronic devices with limited resources such as a wireless telephone, personal digital assistant, etc. Many of the glyphs may never be used but still require storage on the electronic device if a complete set of glyphs is stored.

There have been attempts to solve some of the problems associated with using fonts and using pictograph based languages for printers. See, for example U.S. Pat. No. 5,361,332, entitled "Method of Commonly Using Font Information for Outputting Information in a System Having a Plurality of Information Processing Devices," and U.S. Pat. No. 5,940,581, entitled "Dynamic Font Management for Large Character Sets." However, these solutions still do not solve all of the problems associated with using glyphs on electronic devices with limited resources such as wireless phones or personal digital assistants, etc.

Thus, it is desirable to allow small electronic devices to utilize resource intensive fonts. The fonts should be useable on electronic devices with limited resources, even if the fonts don't actually reside on the electronic devices.

SUMMARY OF THE INVENTION

In accordance with preferred embodiments of the present invention, some of the problems associated are using fonts on electronic devices are overcome. Methods and system for dynamic font subsetting is presented.

One aspect of the present invention includes a method for allowing dynamic font subsetting from an intermediate network device such as a proxy server. Another aspect of the invention includes a method for providing dynamic font subsetting from an intermediate network device such as a proxy server. Another aspect of the invention includes a method for using dynamic font subsetting from a client electronic device. Another aspect of the invention includes a method for using dynamic font subsetting on an electronic device with electronic content from local storage.

One or more directives are inserted into electronic content to identify one or more glyph sub-sets needed to display the multiple characters in one or more desired languages for electronic content. A directive identifies a glyph sub-set including set of glyphs identified in the electronic content and an encoding scheme used to encode the set of glyphs. The glyph sub-set identifies those glyphs needed to display the electronic content.

When electronic content with the one or more directives is processed the one or more directives are identified. If the electronic device does not have the glyph sub-sets needed to display the electronic content requests are sent to an intermediate network device to obtain glyph sub-sets.

These method and system may allow an electronic device with limited resources, such as a wireless telephone, personal digital assistant, network appliance, set-top box, etc., to display electronic content from a computer network such as the Internet or an intranet, with virtually any font, even if the fonts from the electronic content do not exist on the electronic device. Electronic content written in languages such as Chinese, Japanese, Korean, Vietnamese, etc. can be displayed on an electronic device with limited resources using a small number of glyphs from the multiple thousands of possible glyphs that represent characters in such languages.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS DYNAMIC FONT SUBSETTING SYSTEM

Figure 1:
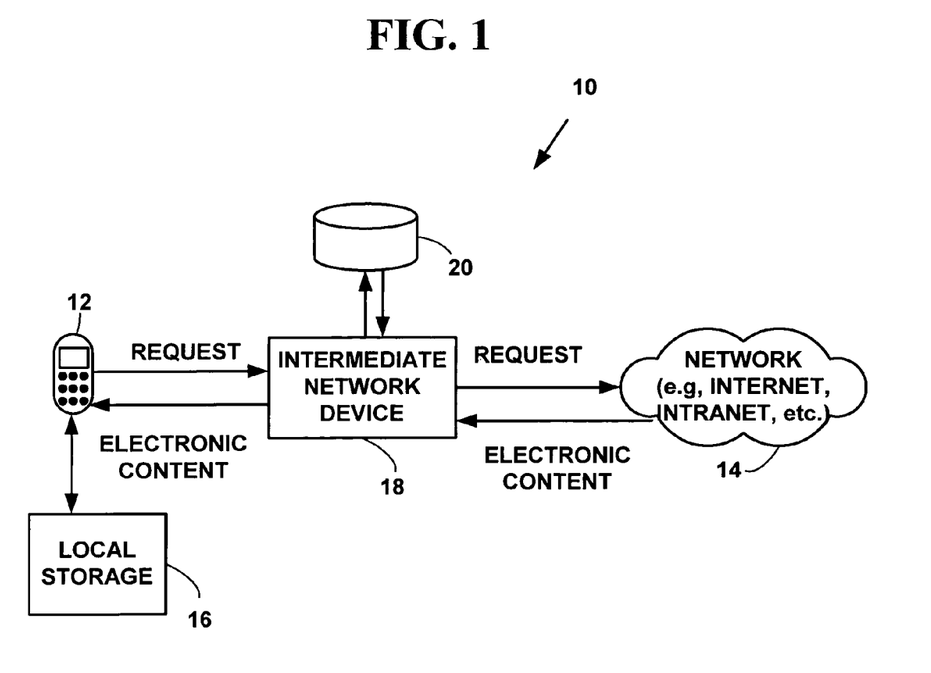
FIG. 1 is a block diagram illustrating a dynamic font subsetting system.

FIG. 1 is a block diagram illustrating a dynamic font subsetting system 10. The dynamic font subsetting system 10 includes multiple components. However, the dynamic font subsetting system is not limited to these components, and more fewer or equivalent components can also be used for a dynamic font sub-setting system.

The dynamic font subsetting system 10 includes an electronic device 12 that requests electronic content including one or more font types from a computer network 14 and/or from local storage 16. The electronic device 12 includes, but is not limited to, electronic devices such as personal computers, wireless telephones, personal digital assistants, hand-held computers, set-top boxes, network appliances and a wide variety of other types of electronic devices.

The computer network 14 includes, but is not limited to, the Internet, an intranet, a local area network ("LAN") or other computer network. The local storage 16 includes, but is not limited to, Random Access Memory ("RAM"), Read-Only Memory ("ROM"), Flash memory, or other types of volatile or non-volatile storage associated with the electronic device 12.

An intermediate network device 18, such as a proxy server, services requests for electronic content from the electronic device 12 by obtaining the desired electronic content from the computer network 14. The intermediate network device 18 sends desired electronic content back to the electronic device 12. A database 20 associated with the intermediate network device 18 stores sets of fonts or other information that can be sent to the electronic device 12. FIG. 1 illustrates a single intermediate network device network device 18 and a single database 20. However, multiple intermediate devices 18 and multiple databases 20 can also be used.

In one embodiment of the present invention, the electronic device 12 requests/recieves electronic content from the intermediate device 18 via the computer network 14. The computer network 14 includes access to the World-Wide-Web on the Internet, an intranet, or other computer network. As is known in the art, the Internet is a world-wide network of interconnected computers. The World-Wide-Web is an information system on the Internet designed for electronic document interchange. In another embodiment of the present invention, the electronic device 12 obtains electronic content from local storage 16 instead of from the intermediate network device 18 and the computer network 14.

Electronic devices for embodiments of the present invention include electronic devices that can interact that are compliant with all or part of standards proposed by the Institute of Electrical and Electronic Engineers ("IEEE"), the International Telecommunications Union-Telecommunication Standardization Sector ("ITU"), the Internet Engineering Task Force ("IETF"), the Mobile Wireless Internet Forum, ("MWIF"), the Wireless Application Protocol ("WAP") Forum, Data-Over-Cable-Service-Interface-Specification ("DOCSIS") standards for Multimedia Cable Network Systems ("MCNS"), and other standards. However, electronic devices based on other standards could also be used and the present invention is not limited to electronic device compliant with the standards listed.

The IEEE standards can be found on the Internet at the Uniform Resource Locator ("URL") "www.ieee.org." The ITU, (formerly known as the CCITT) standards can be found at the URL "www.itu.ch." IETF standards can be found at the URL "www.ietf.org." The WMIF standards can be found at the URL "www.wmif.org." The WAP standards can be found at the URL "www.wapforum.org." The DOCSIS standards can be found at the URL "www.cablemodem.com."

An operating environment for electronic devices and other components of the dynamic font subsetting system 10 for the present invention include a processing system with one or more high speed Central Processing Unit(s) ("CPU") and a memory system. In accordance with the practices of persons skilled in the art of computer programming, the present invention is described below with reference to acts and symbolic representations of instructions or operations that are performed by the processing system, unless indicated otherwise. Such acts, instructions and operations are referred to as being "computer-executed" or "CPU executed."

The memory system may include main memory and secondary storage. The main memory is high-speed random access memory ("RAM"). Main memory can include any additional or alternative high-speed memory device or memory circuitry. Secondary storage takes the form of persistent long term storage, such as Read Only Memory ("ROM"), optical or magnetic disks, organic memory or any other volatile or non-volatile mass storage system. Those skilled in the art will recognize that the memory system can comprise a variety and/or combination of alternative components.

Acts and symbolically represented operations include the manipulation of electrical signals by the CPU. The electrical signals cause transformation of data bits. The maintenance of data bits at memory locations in a memory system thereby reconfigures or otherwise alters the CPU's operation. The memory locations where data bits are maintained are physical locations that have particular electrical, magnetic, optical, or organic properties corresponding to the data bits.

The data bits may also be maintained on a computer readable medium including magnetic disks, optical disks, organic disks and any other volatile or non-volatile mass storage system readable by the CPU. The computer readable medium includes cooperating or interconnected computer readable medium, which exist exclusively on the processing system or may be distributed among multiple interconnected processing systems that may be local or remote to the processing system.

Electronic Content

As is known in the art and is described above, electronic content includes text, hypertext, graphical data or references to graphical data images, audio, video and other content. A hypertext document includes markup codes called "tags." The structure of hypertext documents is defined by document markup languages such as Standard Generalized Markup Language ("SGML"), Hyper Text Markup Language ("HTML"), Compact Hyper Text Markup Language ("cHMTL"), eXtensible Markup Language ("XML"), Handheld Device Markup Language ("HDML"), Voice extensible Markup Language, ("VoxML"), Wireless Markup Language ("WML") and others. Markup languages also allow references to additional content besides text including graphics, animation, audio, video and other electronic data.

Also described above, electronic content is typically displayed for a user with a software application called a "browser." A browser on a hand-held device or other electronic device may be a sub-set of a larger browser, and may not capable of displaying complete content of a requested electronic document as stored on an electronic document server. A browser typically reads an electronic document and renders the electronic document content into a visual display of text, graphics, animation, audio, video, etc., for display on a device such as a personal computer, personal digital assistant, wireless telephone, etc.

Language Information Processing

As is known in the art, a "font" is a single instance of a typeface. A "typeface" refers to the style of a character or glyph. A "character" is a member of a set of shapes used for the organization, control and representation of information. For example, the shape representing letter "S" is a character. A "glyph" is a specific instance of a character. For example, glyphs for the shape representing the letter "S" include "S," "ʃ," etc. Often more than one character is used for a glyph, and a glyph comprised of multiple characters is called a "ligand." The dollar sign "$" is an example of a ligand. The dollar sign ligand includes a glyph for an "S" character as well as a glyph for a bar "|" character.

A "character set" is a collection of characters. A "glyph set" is a collection of glyphs. The English alphabet is a character set that specifies 52 upper and lowercase letters. "Encoding" is the process of mapping a character to a numeric value. Glyph sets are encoded for use on electronic devices. Encoding is typically completed using a matrix of X-rows and Y-cells. A "row" represents values along the vertical axis in the matrix. A "cell" represents values along the horizontal axis in the matrix. In a two-byte encoding scheme a row refers to the first byte and a cell refers to the second byte of the encoding (e.g., for Chinese, Japanese, Korean, Vietnamese, etc.).

One example of an encoding scheme is the American Standard Code for Information Interchange ("ASCII") encoding scheme. The ASCII encoding scheme includes a character set composed of 128 characters, 94 of which are considered printable. Non-printable control characters are encoded with values of 0–31 (decimal), the space character is encoded as a value of 32, the graphic characters are encoded with values from 33–126 and the delete character is encoded as a value of 127. ASCII encoding uses a designated bit pattern encoding scheme in the lower seven bits of one eight-bit byte with the eighth bit set to a value of zero. For example, the character for uppercase "A" has encoding value of 64 in decimal and a bit encoding of 0100–0001 in binary. The character for uppercase "B" has a decimal value of 65 in decimal and bit encoding of 0100–0010 in binary, etc. In this example, the ASCII codes can be represented in a matrix with a row indicated by the first four bits (e.g., 01000) and a cell indicated the second four bits (e.g., 0001 and 0010).

As another example, as is known in the art, the "Big-Five" encoding scheme is used for encoding Chinese characters. The Big-Five name refers to the five companies that collaborated in its development. The Big-Five encoding scheme uses a predetermined encoding scheme in two eight-bit bytes using a disjoint matrix. The Big-Five character encoding space is set into a disjoint matrix of 94×517 with a capacity of 14,758 characters.

Character set standards have been created to manage characters. The character standards are typically maintained by a government or a government-sanctioned organization within a given country. For example, the "JIS X 0208:1997" character set is a Japanese standard character set standard with 6,879 characters, the "TCVN 6056:1995" character set is a Vietnamese standard character set with 3,311 characters, etc.

An output device such as a display or printer uses the numerical encoded values as well as the encoding scheme to display glyphs and ligands in a character set. The numerical encoded values and the encoding scheme are typically used to locate instructions to render glyphs and ligands as outlines into bitmaps of the appropriate size and resolution for display. The bitmaps typically are used to turn pixels (for display units) or dots (for printers) on to allow glyphs and ligands to be viewed.

As an example, electronic content, such as HTML, etc. includes multiple ASCII encoded characters. The ASCII encoded characters are stored for the electronic content as a series of ASCII codes on an electronic device. For example, the word "HI" is stored as ASCII encoded values 72 and 73 in decimal. When an application, such as a browser, desires to display the ASCII encoded information, the ASCII encoded values of 72 and 73 are read, the ASCII encoding scheme and an ASCII matrix is used to locate instructions to display glyphs including patterns for that make up the characters "H" and "I" on a display device.

For more information on language information processing see, "CJKV (Chinese, Japanese, Korean, Vietnamese) Information Processing," by Ken Lunde, O'Reilly & Associates, Inc., Sebastopol, Calif., ISBN 1-56592-224-7, January 1999, incorporated herein by reference.

Allowing Dynamic Font Subsetting From an Intermediate Network Device

Figure 2:
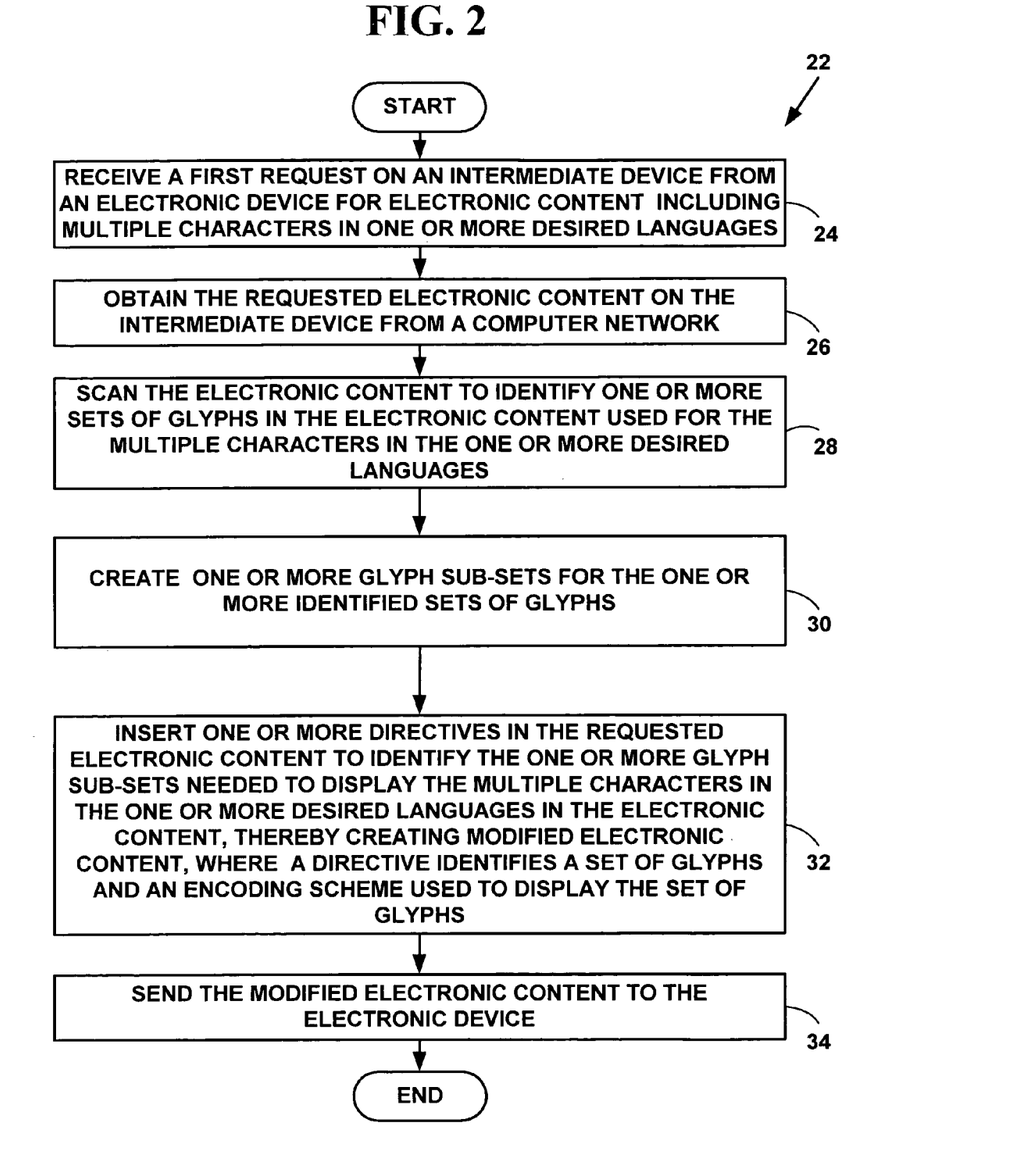
FIG. 2 is a flow diagram illustrating a method for allowing dynamic font subsetting from an intermediate network device.

FIG. 2 is a flow diagram illustrating a Method 22 for allowing dynamic font subsetting from a server device. At Step 24, a first request is received on an intermediate network device from an electronic device for electronic content including a multiple characters in one or more desired languages. At Step 26, the requested electronic content is obtained on the intermediate network device from a computer network. At Step 28, the electronic content is scanned to identify one or more sets of glyphs in the electronic content used for the multiple characters in the one or more desired languages. At Step 30, one or more glyph sub-sets are created for the identified one or more sets of glyphs. The one or more glyph sub-sets include only glyphs identified in the requested electronic content. At Step 32, one or more directives are inserted in the requested electronic content to identify the one or more glyph sub-sets needed to display the multiple characters in one or more desired languages in the requested electronic content, thereby creating modified electronic content. A directive identifies a glyph sub-set including set of glyphs identified in the electronic content and an encoding scheme used to encode the set of glyphs. At Step 34, the modified electronic content is sent to the electronic device.

Method 24 is illustrated with one specific embodiment of the present invention. However, the present invention is not limited to such an embodiment. In such a specific embodiment, at Step 24, an HTTP request is received on a proxy server 18 from an electronic device 12 for electronic content including a multiple Chinese characters.

In such an embodiment of the present invention, the requested electronic content is written in a mark-up language including SGML, HTML, cHTML, XML, HDML, VoxML, WML, or other markup languages. However, the present invention is not limited to electronic content written in these mark-up languages and other types of electronic content can also be used.

Aspects of one specific illustrative embodiment of the present invention are illustrated for Method 22 and electronic content provided in HTML. HTML is described in the IETF Request For Comments ("RFC") 2068, incorporated herein by reference. However, the present invention is not limited to these specific illustrative embodiments and other embodiments can also be used.

At Step 26, the requested electronic content is obtained on a proxy server 18 from the Internet, or an intranet 14. At Step 28, the electronic content is scanned to identify one or more sets of glyphs in the electronic content used for the multiple characters in the one or more desired languages. Table 1 illustrates an exemplary HTML document obtained by the proxy server 18.

TABLE 1

```
<HTML>
<HEAD>
<META HTTP-EQUIV="Content-Type"
   CONTENT="text/html"; CHARSET="Big5">
</HEAD>
<BODY>
<H1>CG1 CG2 CG3 CG4
</BODY>
</HTML>
```

Table 1 illustrates an exemplary HTML document obtained from the Internet 14. As is known in the art, HTML META tags are used to specify information about an HTML document. The HTML META tags are used in a HTML document header defined by the HTML <HEAD> and </HEAD> mark-up tags. The META tag in Table 1 indicates the HTML document is HTML text and the character set and encoding that is used for the Chinese glyphs (e.g., CG1, CG2, CG3 and CG4) in the document is Big5. The monikers CGx, where x=1, 2, 3, . . . , are used in place of the actual Chinese glyphs for the sake of simplicity.

At Step 28, the electronic content (e.g., Table 1) is scanned to identify multiple numeric Big-Five codes for the Chinese glyphs CG1, CG2, CG3 and CG4. The META tag in Table 1 may be used to help identify what character set(s) are included in the electronic content (e.g., Big5).

At Step 30, one or more glyph sub-sets are created for the identified one or more sets of glyphs. The one or more glyph sub-sets include only glyphs identified in the requested electronic content. For example, a glyph sub-set called "Big5" is created including only the four identified Chinese glyphs CG1, CG2, CG3, and CG4.

As was discussed above, the whole Big5 character set includes 14,758 possible Chinese characters. Only four glyphs representing four characters from the set of 14,758 characters are included in the glyph sub-set called Big5. The remaining 14,754 characters are not necessary to display the electronic content illustrated in Table 1, so these characters are not added to the glyph sub-set.

In one embodiment of the present invention, the glyph sub-set is created with the same name as the name used for the original character set (e.g., Big5). In such an embodiment, display software used on the electronic device 12 would not have to be modified to display the glyph sub-set. For example, if the electronic device 12 included an Internet browser with an application to display glyphs for characters in the Big-Five character set from a file called "Big5" then the glyph sub-set could be created and stored in a file with the name "Big5." This allows the display software to read a file called Big5 to display Chinese characters that may include a glyph sub-set created by Method 24, or the glyphs for full set of 14,000+Chinese characters.

In another embodiment of the present invention, the glyph sub-set is created with a name different from the original character set. In such an embodiment, a new name may be selected to go along with a new encoding scheme. For example, if only four Chinese glyphs were to be display (e.g., those from Table 1) a glyph sub-set called "Big5-1" may be created including only the four identified Chinese glyphs. The four glyphs could then be stored in a compressed or altered matrix or other encoding table instead of the disjoint matrix of 94×517 rows and cells required for Big5 Chinese characters. This embodiment may save additional storage space on the electronic device 12 and make transmission of a glyph sub-set to the electronic device 12 faster.

In such an embodiment, the encoding scheme may also be altered to properly decode identifiers (e.g., numerical values) for the identified Chinese glyphs. For example, suppose the four identified Chinese glyphs were assigned numerical values in the glyph sub-set of 1, 2, 3 and 4 decimal and stored in a compressed matrix with one row and four cells. The encoding scheme identified (e.g., Big5-1-encode) would then be used to map the numerical values of 1, 2, 3 and 4 from the compressed matrix into the uncompressed matrix of 96×5 17 rows and cells used to display glyphs for Big5 Chinese characters.

In one embodiment of the present invention, at Step 30, one or more glyph sub-sets are created for Chinese, Japanese, Korean, Vietnamese, Hebrew or Arabic glyphs. However, the present invention is not limited to such an embodiment and one or more glyph sub-sets can be created for virtually any language (e.g., English).

At Step 32, one or more directives are inserted in the requested electronic content to identify the one or more glyph sub-sets needed to display the multiple characters in one or more desired languages in the requested electronic content, thereby creating modified electronic content. A directive identifies glyph sub-set includes a set of glyphs identified in the electronic content and an encoding scheme used to encode the set of glyphs.

In one embodiment of the present invention, a directive is an additional HTML META tag. However the directive is not limited to a HTML META tag and other types of directives can also be used. Table 2 illustrates exemplary directives used in a HTML document.

TABLE 2

® 1999 by Spyglass, Inc.
<HEAD>
...
<META type="glyph-subset-x" type="encoding-x" src=url>
<META type="glyph-subset-y" type="encoding-y" src=url>
<META type="glyph-subset-z" src="url">
<META type="encoding-z" src=url>
...
</HEAD>

As is illustrated in Table 2, a directive identifies glyph set and encoding scheme used to display the set of glyphs. The first portion of the directive includes a "type=" attribute that identifies a glyph sub-set. The second portion of the directive includes a "type=" attribute that identifies an encoding scheme used to encode the set of glyphs. The third portion of the directive includes a "src=" directive that identifies a source to locate the set of glyphs (e.g., intermediate device 18). The "src=" directive may include a URL, an actual network address (e.g., IP or MAC), a port number (e.g., HTTP port 80) or other identifier used to locate the set of glyphs.

The directive may include information about the set of glyphs and the encoding scheme as well as the source in one single directive or may be split among several directives as is also illustrated in Table 1. For example, one directive may include an identifier for glyph sub-set (e.g., glyph-subset-z) while a second directive may include the encoding scheme (e.g., encoding-z) used to encode the set of glyphs for that identifier.

Table 3 illustrates the modified electronic content including one exemplary directive that may be used to identify glyph sub-set representing the Chinese characters in the original electronic content illustrated in Table 1. However, the present invention is not limited to using one directive for the Chinese language and multiple directives may be used in electronic content to identify one or more different encoding scheme or one or more different glyph sub-sets for characters for multiple different languages. For example, multiple directives for multiple different glyph sub-sets may be used by a network appliance that may display electronic content in multiple languages (e.g., an electronic information kiosk in an airport).

TABLE 3

® 1999 by Spyglass, Inc.
<HEAD>
<META HTTP-EQUIV="Content-Type" 'CONTENT=text/html; CHARSET="Big5">

TABLE 3-continued

```
<META TYPE="Big5" "SRC=http://proxy_server/Big5">
<META TYPE="Big5-encode" "SRC=http://proxy server/Big5/Big5-encode">
</HEAD>
<BODY>
<H1>CG1 CG2 CG3 CG4
</BODY>
</HTML>
```

At Step 34, the modified electronic content illustrated in Table 3 is sent to the electronic device 12.

In another embodiment of the present invention, the intermediate network device 18 does not scan or modify the electronic content to include the directives. The one or more directives are included by the author of the electronic content. In such an embodiment, the electronic device is used to obtain electronic content including the directives from the computer network 14.

In another embodiment of the present invention, the electronic device 12 reads electronic content including the directives from local storage 16 and does not use intermediate network device 18 or computer network 14. In such an embodiment, the electronic content includes directives created by the author of the electronic content. Further details of such an embodiment are explained below.

Method 24 can be used to allow an electronic device 12 to display electronic content for virtually any language by providing only a small sub-set of glyphs that are required to display the electronic content. For example, Method 24 can be used with electronic content written in English. However, Method 24 may provide a larger saving of resources for languages with a large number of possible characters (e.g., Chinese, Japanese, Korean, Vietnamese, etc.)

Performing Dynamic Font Subsetting From an Intermediate Network Device

Figure 3:
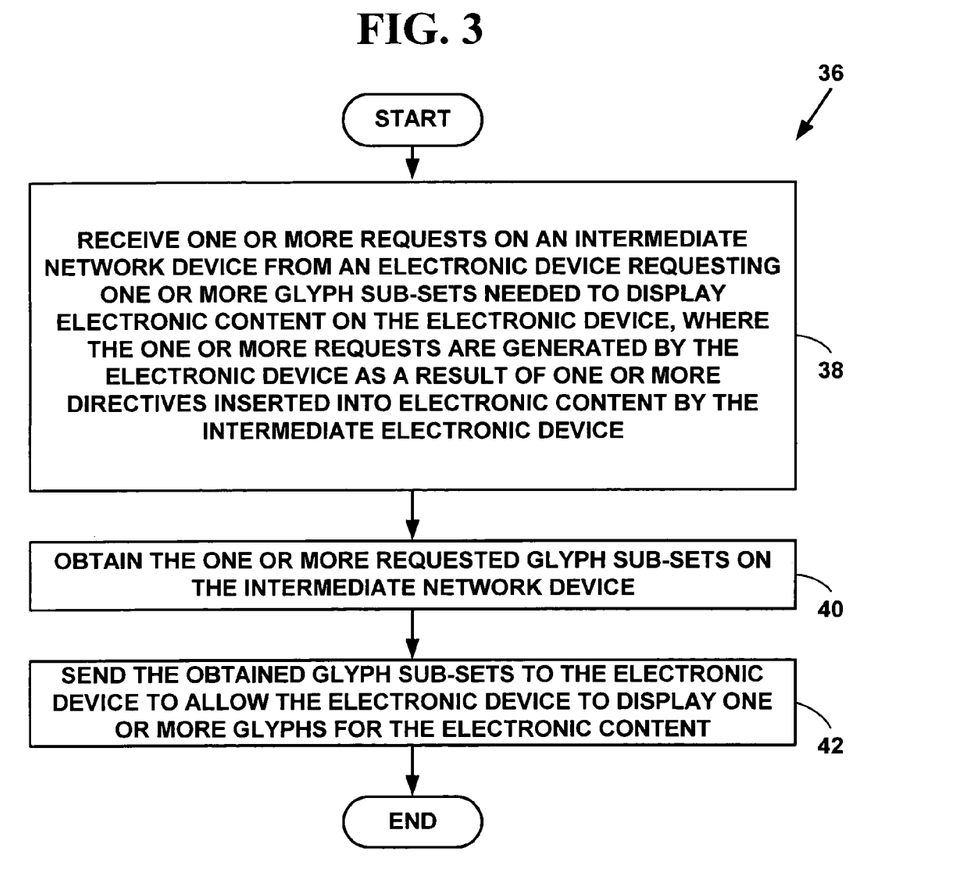
FIG. 3 is a flow diagram illustrating a method for providing dynamic font subsetting from an intermediate network device.

FIG. 3 is a flow diagram illustrating a Method 36 for performing dynamic font subsetting from an intermediate network device. At Step 38, one or more requests are received on an intermediate network device from an electronic device requesting one or more glyph sub-sets needed to display modified electronic content on the electronic device. The one or more requests are generated by the electronic device as a result of one or more directives inserted into the modified electronic content by the intermediate network device. The one or more directives identifies a glyph sub-set including a set of glyphs identified in the modified electronic content and an encoding scheme used to encode the set of glyphs. At Step 40, the one or more glyph sub-sets are obtained. At Step 42, the one or more glyph sub-sets are sent to the electronic device to allow the electronic device to display one or more glyphs in the modified electronic content.

Method 36 is illustrated with one specific embodiment of the present invention. However, the present invention is not limited to such an embodiment. In such a specific embodiment, At Step 38, one or more HTTP requests are received on an a proxy server 16 from an electronic device 12 requesting one or more glyph sub-sets needed to display modified electronic content (e.g., from Table 3) on the electronic device 12. The one or more requests are generated by the electronic device 12 as a result of one or more directives inserted into the modified electronic content by the proxy server 18 (e.g., with Method 24). The one or more directives identifies a glyph sub-set (e.g., Big5) including a set of glyphs identified in the modified electronic content and an encoding scheme used to encode the set of glyphs.

At Step 40, the one or more glyph sub-sets are obtained by the proxy server 18. In one embodiment of the present invention, the proxy server 18 obtains the one or more glyph sub-sets from the database 20. In another embodiment of the present invention, the proxy server 18 may obtain the one or more glyph sub-sets from other locations on the computer network 14. In yet another embodiment of the present invention, the proxy server 18 may obtain some of the glyph subsets from the database 20 and other glyph sub-sets from other locations on the computer network 14.

In one embodiment of the present invention, the one or more glyph sets are obtained regardless of what glyph sub-sets may already exist on the electronic device 12. In another embodiment of the present invention, Step 40 includes consulting a database associated with intermediate network device to determine what glyph sub-sets already exist on the electronic device. In such an embodiment, the electronic device may be identified by a device type identifier included in a header associated with a request. Only those glyphs that do not already exist on the electronic device are obtained at Step 40.

At Step 42, the one or more glyph sub-sets (e.g., Big5) are sent to the electronic device 12 to allow the electronic device to display one or more glyphs in the modified electronic content (e.g., Table 3). In one embodiment of the present invention, the multiple requests received at Step 38 could include multiple requests for one or more glyph sub-sets each including a small number of glyphs and stored in a file called Big5. A filed named "Big5" is then sent multiple times. Even though the file name was the same (i.e., Big5), the one or more Big5 files included different sets of glyphs. The multiple files may come from the same location (e.g., proxy server 18) or multiple different locations. In addition, the multiple files with the same names could also use the same encoding scheme or different encoding schemes as is indicated in the directives.

In another embodiment of the present invention, the multiple requests received at Step 38 could include multiple requests for multiple glyph sub-sets for multiple languages or the same language but include requests for glyph sub-sets with special encoding schemes (e.g., a compressed matrix).

Dynamic Font Subsetting From a Client Electronic Device

Figure 4:
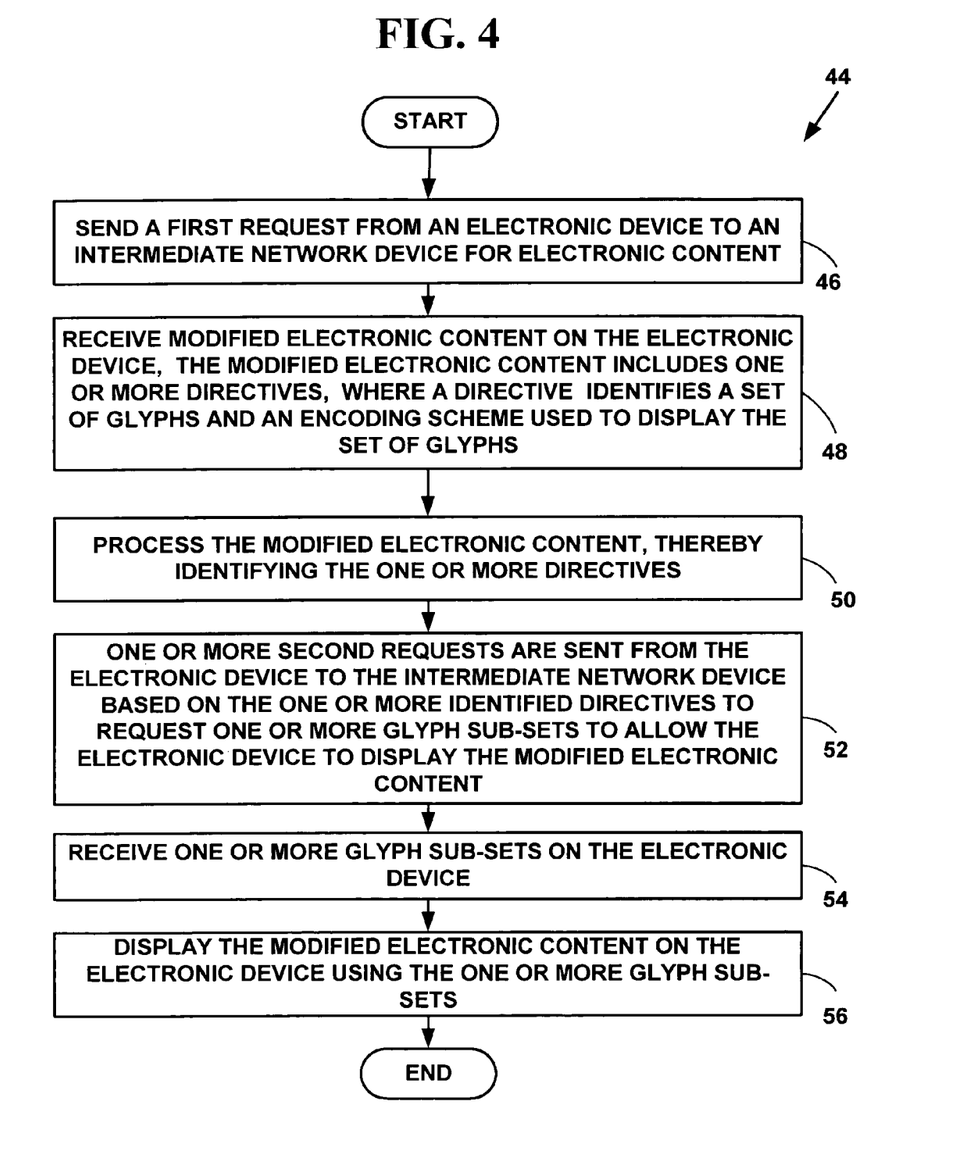
FIG. 4 is a flow diagram illustrating a method for using dynamic font subsetting from a client electronic device.

FIG. 4 is a flow diagram illustrating a Method 44 for using dynamic font subsetting from a client electronic device. At Step 46, a first request is sent from an electronic device to an intermediate network device for electronic content on a computer network. At Step 48, modified electronic content is received from the intermediate network device on the electronic device. The modified electronic content includes one or more directives. A directive identifies a glyph sub-set including a set of glyphs identified in the modified electronic content and an encoding scheme used to encode the set of glyphs. At Step 50, the modified electronic content is processed, thereby identifying the one or more directives. At Step 52, one or more second requests are sent to the intermediate network device based on the one or more identified directives to request one or more glyph sub-sets to allow the electronic device to display the modified electronic content. At Step 54, one or more glyph sub-sets are received from the intermediate network device. At Step 56, the modified electronic content is displayed using the one or more glyph sub-sets.

Method 44 is illustrated with one specific embodiment of the present invention. However, the present invention is not limited to such an embodiment. In such a specific embodiment, at Step 46 a first HTTP request is sent from the electronic device 12 the proxy server 18 for electronic content on a computer network 14. At Step 48, modified electronic content (e.g., Table 3) is received from the proxy server 18 on the electronic device. The modified electronic content includes one or more directives. The modified electronic content could be modified by intermediate network device 18 using Method 24 or by an author of the electronic content. At Step 50, the modified electronic content is processed, thereby identifying the one or more directives. At Step 52, one or more HTML META tag requests are sent to the intermediate network device based on the one or more identified directives to request one or more glyph sub-sets (e.g., Big5 including the Chinese glyphs CG1–CG4) to allow the electronic device 12 to display the modified electronic content. At Step 54, one or more glyph sub-sets are received from the intermediate network device (e.g., the Big5 sub-set including the Chinese glyphs CG1–CG4). At Step 56, the modified electronic content is displayed on the electronic device 12 using the one or more glyph sub-sets.

Thus, the electronic device 12 is able to display the electronic content including the four Chinese glyphs CG1–CG4 even the electronic device 12 did not originally include any Chinese glyphs. The electronic device 12 is able to display the electronic content with the four Chinese glyphs without downloading all 14,000+Big5 Chinese glyphs.

Dynamic Font Subsetting With Electronic Content From Local Storage

Figure 5:
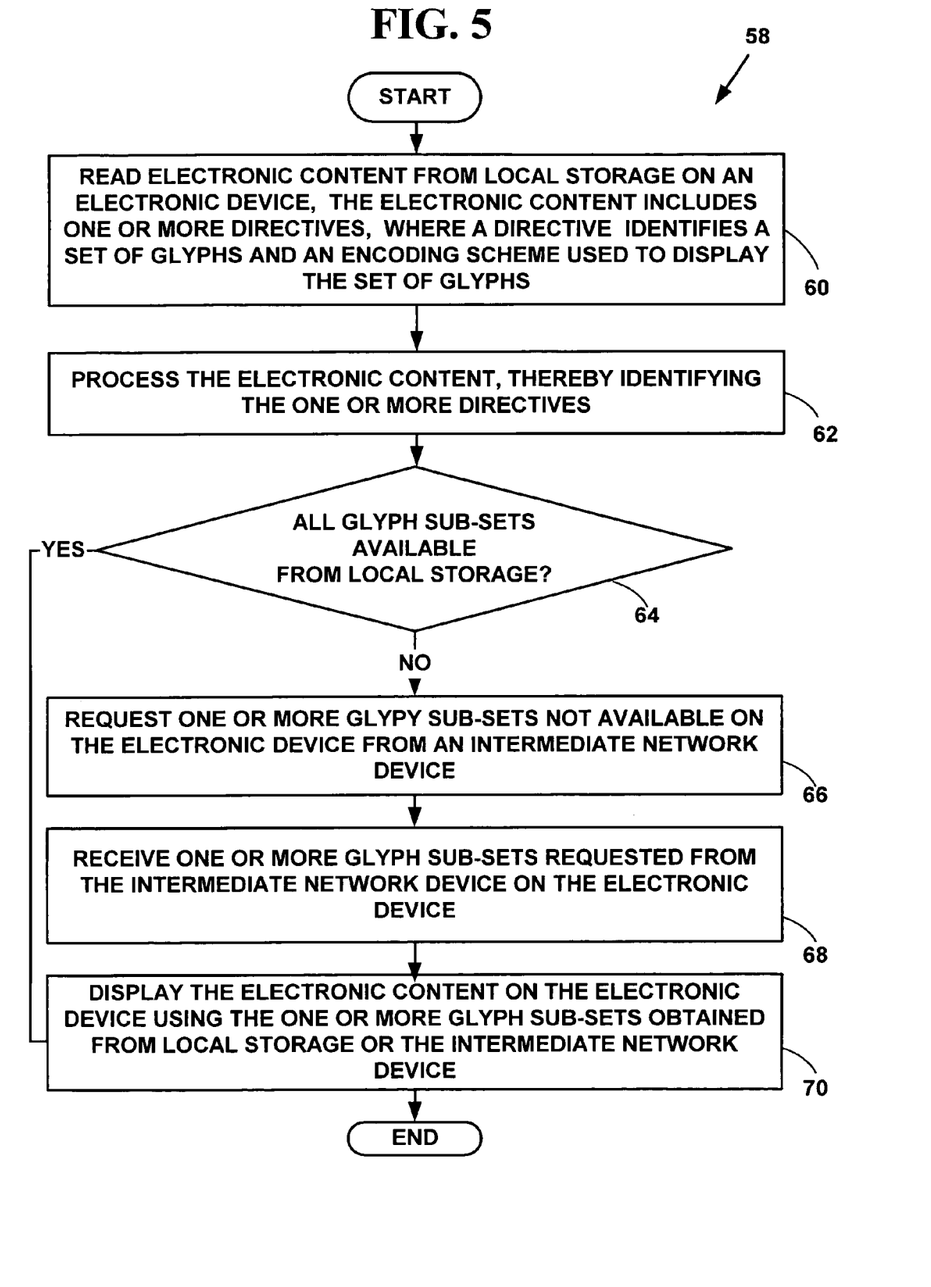
FIG. 5 is a flow diagram illustrating a method for using dynamic font subsetting with electronic content from local storage.

FIG. 5 is a flow diagram illustrating a Method 58 for using dynamic font subsetting with electronic content from local storage. At Step 60, electronic content is read from local storage on an electronic device. The electronic content includes one or more directives. The directives were added to the electronic content by an author of the electronic content. A directive identifies a glyph sub-set including a set of glyphs identified in the electronic content and an encoding scheme used to encode the set of glyphs. At Step 62, the electronic content is processed on the electronic device, thereby identifying the one or more directives. At Step 64, a test is conducted to determine from the one or more directives whether a desired glyph sub-set can be obtained from local storage on the electronic device. If a desired glyph sub-set can be obtained from local storage on the electronic device, Step 70 is executed. If a desired glyph sub-set can not be obtained from local storage on the electronic device, at Step 66 requests are sent to an intermediate network device to obtain glyph sub-sets that can not be obtained from local storage. At Step 68 the glyph sub-sets that can not be obtained from local storage are obtained from the intermediate network device. At Step 70, the electronic content is displayed using the one or more glyph sub-sets from local storage or from the intermediate network device.

Method 58 is illustrated with one specific embodiment of the present invention. However, the present invention is not limited to such an embodiment. In such a specific embodiment, at Step 60, an HTML document is read from local storage 16 on an electronic device 12. The HTML document includes one or more directives. At Step 62, the HTML document is processed on the electronic device 12, thereby identifying the one or more directives. At Step 64 a test is conducted to determine from the one or more directives whether a desired glyph sub-set can be obtained from RAM on the electronic device 12. If a desired glyph sub-set can not be obtained from RAM on the electronic device 12, at Step 66 requests are sent to a proxy server 18 to obtain glyph sub-sets that can not be obtained from RAM. At Step 68, the glyph sub-sets that can not be obtained from RAM are obtained from the proxy server 18. At Step 70, the HTML document is displayed using the one or more glyph sub-sets obtained from the proxy server 18.

These methods and system described herein may allow an electronic device with limited resources to display electronic content from a computer network such as the Internet or an intranet or from local storage with virtually any font type, even if the fonts from the electronic content do not exist on the electronic device. The fonts can be used to display text from an electronic document as well as for text for other media types (e.g., text added to a frame from a video stream, etc.).

Fonts are displayed using glyph sub-sets for characters from one or more languages identified in electronic content. Such glyph sub-sets include a small number of the many thousands of possible glyphs (e.g., Chinese, Japanese, Korean, Vietnamese, Hebrew or Arabic glyphs) available to display characters for such languages. However, glyph sub-sets for characters from virtually any language can be used with electronic devices with limited resources.

It should be understood that the programs, processes, methods and system described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments hardware, firmware, or other implementations may alternatively be used including combinations thereof.

The claims should not be read as limited to the described order or elements unless stated to that effect. Therefore, all embodiments that come within the scope and spirit of the following claims and equivalents thereto are claimed as the invention.

We claim:

1. A method for dynamic font subsetting, the method comprising:

an intermediate network device receiving, over a first network, a first request for requested electronic content from an electronic device;

the intermediate network device obtaining the requested electronic content from a second network, the requested electronic content including a plurality of characters in one or more desired languages;

the intermediate network device scanning the requested electronic content to identify one or more sets of glyphs in the requested electronic content used for the plurality of characters in the one or more desired languages;

creating one or more glyph sub-sets for the one or more identified sets of glyphs, wherein the one or more glyph sub-sets include the sets of glyphs identified in the requested electronic content;

the intermediate network device, responsive to the scanning of the requested electronic content and the creating of the one or more glyph sub-sets, inserting one or more directives in the requested electronic content to identify the one or more glyph sub-sets, thereby creating modified electronic content, wherein a directive from the one or more directives identifies a set of glyphs from the one or more sets of glyphs identified in the requested electronic content and a pre-determined encoding scheme used to encode the set of glyphs; and the intermediate network device sending the modified electronic content to the electronic device over the first network.

2. A computer readable medium having stored therein instructions for causing a central processing unit to execute the method of claim 1.

3. The method of claim 1 wherein receiving the first request comprises:

receiving a request for electronic content written in a mark-up language selected from a group of languages that includes standard generalized markup language, hyper text markup language, compact hyper text markup language, extensible markup language, handheld device markup language, voice extensible markup language, and wireless markup language.

4. The method of claim 1 wherein the creating of the one or more glyph sub-sets comprises creating one or more glyph sub-sets for glyphs selected from a group of glyphs comprising Chinese glyphs, Japanese glyphs, Korean glyphs, Vietnamese glyphs, Hebrew glyphs, and Arabic glyphs.

5. The method of claim 1 wherein the second network includes a network selected from a group of networks comprising the Internet, an intranet, and a local area network.

6. The method of claim 1 wherein the electronic device includes a device selected from a group of devices comprising a personal computer, a wireless telephone, a personal digital assistant, a hand-held computer, a set-top box, and a network appliance.

7. The method of claim 1 wherein inserting of the one or more directives in the requested electronic content comprises:

inserting one or more directives as hyper text markup language meta tags into a hyper text markup language header associated with the requested electronic content.

8. A method for dynamic font subsetting, the method comprising:

an intermediate network device identifying a glyph set in a requested electronic content obtained by the intermediate network device in response to a first request received over a first network from an electronic device, wherein the intermediate network device obtained the requested electronic content over a second network in response to the first request;

the intermediate network device identifying a glyph sub-set from the glyph set, the glyph sub-set including glyphs identified in the requested electronic content;

the intermediate network device inserting one or more directives into the requested electronic content to create modified electronic content, the one or more directives identifying the glyph set and a pre-determined encoding scheme used to encode the glyph set;

the intermediate network device receiving a second request from the electronic device for the glyph sub-set, the request being generated by the electronic device as a result of the one or more directives;

the intermediate network device obtaining the glyph sub-set; and the intermediate network device sending the glyph sub-set to the electronic device over the first network to allow the electronic device to display glyphs in the modified electronic content.

9. A computer readable medium having stored therein instructions for causing a central processing unit to execute the method of claim 8.

10. The method of claim 8 wherein the obtaining of the glyph subset is from a database associated with the intermediate network device.

11. The method of claim 8 wherein the obtaining of the glyph subset comprises:

consulting a database associated with the intermediate network device to determine if the glyph sub-set already exists on the electronic device; and creating the glyph sub-set if the glyph sub-set does not already exist on the electronic device.

12. The method of claim 8 wherein the obtaining of the one or more glyph subsets comprises:

creating a database entry for the electronic device in a database associated with the intermediate network device, wherein the database entry includes an identifier for the electronic device and an identifier for the glyph sub-set sent to the electronic device by the intermediate network device.

13. The method of claim 8 wherein the receiving of the request comprises:

receiving one or more requests for modified electronic content including one or more directives written in a mark-up language selected from a group of languages including standard generalized markup language, hyper text markup language, compact hyper text markup language, extensible markup language, handheld device markup language, voice extensible markup language, and wireless markup language.

14. The method of claim 8 wherein the obtaining of the glyph sub-set comprises:

obtaining one or more glyph sub-sets for glyphs selected from a group of glyphs comprising Chinese glyphs, Japanese glyphs, Korean glyphs, Vietnamese glyphs, Hebrew glyphs, and Arabic glyphs.

15. A method for dynamic font subsetting, the method comprising:

an electronic device sending a first request for electronic content to an intermediate network device over a first network;

responsive to the sending of the first request for the electronic content, the electronic device receiving modified electronic content from the intermediate network device over the first network, wherein the modified electronic content is created responsive to the first request and includes the electronic content obtained by the intermediate network device over a second network, and one or more directives determined by the intermediate network device, wherein a directive identifies a glyph sub-set including a set of glyphs identified in the modified electronic content and a pre-determined encoding scheme used to encode the set of glyphs;

the electronic device processing the modified electronic content, thereby identifying the one or more directives;

the electronic device sending at least one second request to the intermediate network device based on the one or more identified directives to request one or more glyph sub-sets to allow the electronic device to display the modified electronic content;

the electronic device receiving one or more glyph sub-sets from the intermediate network device in response to the at least one second request; and the electronic device displaying the modified electronic content using the one or more glyph sub-sets.

16. A computer readable medium having stored therein instructions for causing a central processing unit to execute the method of claim 15.

17. The method of claim 15 wherein the electronic device includes a device selected from a group of devices comprising a personal computer, a wireless telephone, a personal digital assistant, a hand-held computer, a set-top box, and a network appliance.

18. The method of claim 15 wherein receiving modified electronic content comprises:

receiving modified electronic content with a plurality of font tags written in a mark-up language selected from a group of languages including standard generalized markup language, hyper text markup language, compact hyper text markup language, extensible markup language, handheld device markup language, voice extensible markup language, and wireless markup language.

19. The method of claim 15 wherein receiving one or more glyph sub-sets from the intermediate network device comprises:

receiving one or more glyph sub-sets for glyphs selected from a group of glyphs comprising Chinese glyphs, Japanese glyphs, Korean glyphs, Vietnamese glyphs, Hebrew glyphs, and Arabic glyphs.

20. The method of claim 15 wherein processing the modified electronic content comprises:

identifying one or more directives as hyper text markup language meta tags into a hyper text markup language header associated with the modified electronic content.

21. A method for dynamic font sub setting, the method comprising:

an electronic device reading modified electronic content from local storage on the electronic device, wherein the modified electronic content includes requested electronic content and one or more directives, wherein a directive from the one or more directives identifies a glyph sub-set including a set of glyphs identified in the requested electronic content and a pre-determined encoding scheme used to encode the set of glyphs;

the electronic device processing the modified electronic content, thereby identifying the one or more directives, the directives being inserted in the requested electronic content to create the modified electronic content;

the electronic device determining from the one or more directives whether a desired glyph sub-set can be obtained from local storage on the electronic device, and if not, sending one or more requests over a network to an intermediate network device to obtain glyph sub-sets that can not be obtained from local storage on the electronic device;

receiving, from the intermediate network device over the network, the glyph sub-sets that can not be obtained from local storage from the intermediate network device on the electronic device; and displaying the modified electronic content on the electronic device using the glyph sub-sets obtained from the intermediate network device.

22. A computer readable medium having stored therein instructions for causing a central processing unit to execute the method of claim 21.

23. The method of claim 21 wherein the one or more glyph sub-sets include glyphs selected from a group of glyphs comprising Chinese glyphs, Japanese glyphs, Korean glyphs, Vietnamese glyphs, Hebrew glyphs, and Arabic glyphs.

24. The method of claim 21 wherein processing the electronic content comprises:

identifying one or more directives as hyper text markup language meta tags into a hyper text markup language header associated with the modified electronic content.

25. The method of claim 21 wherein the electronic device includes a device selected from a group of devices comprising a personal computer, wireless telephone, personal digital assistant, hand-held computer, set-top box, and network appliance.

26. The method of claim 21 further comprising:

determining from the one or more directives in the modified electronic content whether a desired glyph sub-set can be obtained from local storage on the electronic device, and if so, displaying the modified electronic content on the electronic device using the one or more glyph sub-sets obtained from local storage.

27. A dynamic font subsetting system, comprising:

modified electronic content including requested electronic content as obtained by an intermediate network device over a first network and sent to an electronic device over a second network in response to a first request from the electronic device for the requested electronic content, and further including one or more directives for identifying one or more glyph sub-sets, the one or more glyph sub-sets including sets of glyphs identified in the requested electronic content, and one or more pre-determined encoding schemes used to encode the sets of glyphs, wherein the sets of glyphs are used to represent a plurality of characters in one or more desired languages included within the requested electronic content; and the electronic device to request the requested electronic content and to receive and display the modified electronic content, wherein the electronic device does not have stored information for all glyphs for all characters in the one or more desired languages.

28. The dynamic font subsetting system of claim 27 further comprising the intermediate network device to receive the first request from the electronic device for the requested electronic content, obtain the requested electronic content from the first network, the requested electronic content including the plurality of characters in the one or more desired languages, scan the requested electronic content to identify the sets of glyphs in the requested electronic content used for the plurality of characters in the one or more desired languages, create the one or more glyph sub-sets for the sets of glyphs, wherein the one or more glyph sub-sets include the sets of glyphs identified in the requested electronic content, insert the one or more directives in the requested electronic content to identify the one or more glyph sub-sets, thereby creating the modified electronic content, wherein a directive identifies a glyph sub-set including a set of glyphs identified in the requested electronic content and an encoding scheme used to encode the set of glyphs, send the modified electronic content to the electronic device over the second network.

29. The dynamic font subsetting system of claim 28 further comprising:

a database associated with the intermediate network device to store the one or more glyph sub-sets including sets of glyphs obtained or created by the intermediate network device to display the modified electronic content on the electronic device and to store database entries for a plurality of electronic devices, wherein a database entry includes an identifier for the electronic device and a list of one or more glyph sub-sets obtained or created by the intermediate network device for the electronic device.

30. A method performed by an intermediate network device, the method comprising:

receiving, over a first network, a first request for requested electronic content from a portable electronic device;

obtaining the requested electronic content from a second network, wherein the requested electronic content includes a plurality of characters in one or more desired languages;

scanning the requested electronic content to identify one or more sets of glyphs in the requested electronic content used for the plurality of characters;

creating one or more glyph sub-sets for the one or more identified sets of glyphs, wherein the one or more glyph sub-sets include glyphs identified in the requested electronic content;

inserting one or more directives in the requested electronic content to identify the one or more glyph sub-sets, thereby creating modified electronic content; and sending the modified electronic content to the electronic device over the first network.

31. The method of claim 30, further comprising:

receiving, over the first network and in response to sending the modified electronic content, at least one second request from the electronic device for the one or more glyph sub-sets; and sending the one or more glyph sub-sets to the electronic device over the first network.

32. The method of claim 30, wherein the first network and the second network are a same network.

33. A method performed by an electronic device, the method comprising:

sending a first request for electronic content to an intermediate network device over a first network;

responsive to the sending of the first request, receiving modified electronic content from the intermediate network device over the first network, wherein the modified electronic content is created responsive to the first request, and includes the electronic content obtained by the intermediate network device over a second network, and one or more directives, which identify one or more glyph sub-sets corresponding to a set of glyphs identified by the intermediate network device from the electronic content;

sending at least one second request to the intermediate network device, based on the one or more directives, to request the one or more glyph sub-sets;

receiving the one or more glyph sub-sets from the intermediate network device in response to the at least one second request; and displaying the modified electronic content using the one or more glyph sub-sets.

34. The method of claim 33, wherein the first network and the second network are a same network.

* * * * *

UNITED STATES PATENT AND TRADEMARK OFFICE
CERTIFICATE OF CORRECTION

PATENT NO.      : 7,155,672 B1                                              Page 1 of 1
APPLICATION NO. : 09/576754
DATED           : December 26, 2006
INVENTOR(S)     : Adler et al.

It is certified that error appears in the above-identified patent and that said Letters Patent is hereby corrected as shown below:

On the title page, item (73), in "Assignee", in column 1, line 1, delete "Spyglass, Inc.," and insert -- OpenTV Corp., --, therefor.

Signed and Sealed this

Eighth Day of July, 2008

JON W. DUDAS
*Director of the United States Patent and Trademark Office*